United States Patent [19]

Cichetti, Jr. et al.

[11] 3,887,769

[45] June 3, 1975

[54] FRAME SYNCRHONIZATION OF ELASTIC DATA BIT STORES

[75] Inventors: Michael Peter Cichetti, Jr., Staten Island, N.Y.; Robert Jeffrey Fretz, Red Bank, N.J.

[73] Assignee: Bell Telephone Laboratories, Incorporated, Murray Hill, N.J.

[22] Filed: Apr. 4, 1973

[21] Appl. No.: 347,851

[52] U.S. Cl. ........ 178/69.5 R; 235/92 DP; 235/92 R

[51] Int. Cl. .............................................. H04l 7/00

[58] Field of Search ....... 235/92 CC, 92 SH, 92 DP; 340/154; 178/69.5 R

[56] References Cited

UNITED STATES PATENTS

| | | | |
|---|---|---|---|
| 3,566,090 | 2/1971 | Johnson | 235/92 SH |
| 3,623,070 | 11/1971 | Johnson | 235/92 SH |
| 3,651,511 | 3/1972 | Andrews | 340/154 |

*Primary Examiner*—Joseph M. Thesz, Jr.
*Attorney, Agent, or Firm*—Roy C. Lipton

[57] ABSTRACT

Shift register stages delay incoming frames of data to align each frame with framing pulses of a local clock and to compensate for jitter of the incoming data stream. Variable delay is provided by a counter whose count defines the register output stage.

Framing synchronization is initially obtained, or regained where lost, by first determining when the framing signal shifts to the output stage, then advancing the count at the incoming bit rate to define each successive stage when the framing signal shifts thereto and halting the advance when the local framing pulse is generated. If the count advances to define a final one of the register stages, the count is reduced by a number equal to the number of bits in a frame. If the count is decreased to define an initial stage, the count is increased by this same number.

8 Claims, 5 Drawing Figures

FRAME SYNCRHONIZATION OF ELASTIC DATA BIT STORES

FIELD OF THE INVENTION

This invention relates to elastic data stores and, more particularly, to data bit stores or registers whose storage areas may be modified to store a variable number of bits, to thereby provide variable delay.

DESCRIPTION OF THE PRIOR ART

In synchronous time-division multiplex data transmission systems, each terminal of the transmission link is provided with a local clock source for the timing of operations at that terminal. At the sending terminal, the local clock generates bit and framing pulses to align the outgoing bits in appropriate time slots, assembles frames of data (each frame having a fixed number of bits), and controls the insertion of framing bits or signals which define the demarcations between successive frames. At the receiving terminal, the local clock thereat similarly generates bit and framing pulses to disassemble the incoming frames and recover the bits in each of the time slots.

To accomplish the above-described functions, the clocks must be frequency synchronized. This is conventionally achieved by designating one clock as a master and the other clock as a slave (it being understood that either the clock at the transmitting center or the receiving center may be the master or that a third clock may be the master and the clocks at both transmitting and receiving centers the slaves). Moreover, at the receiving terminal it is advantageous that there be phase and frame synchronization between the incoming data train and the local clock. This is attained by delaying the incoming data train so that the delayed framing signals in the train are in alignment with the framing pulses of the local clock. Since a transmission link, such as a cable, has propagation delay, acting as a delay line for the data train, and further, since the clocks, although frequency synchronized may be out of frame synchronization because of propagation delay on the links interconnecting the clocks to each other or to the master, the incoming data train can have any phase and frame relation with the local clock. Hence, a delay of up to one frame is necessary to align the data train with the framing pulses of the local clock.

All transmission links, and especially cable, vary in electrical length and, therefore, in propagation delay, with changes in temperature, putting jitter on the data stream. To compensate for these variations, the delay of the data train at the receiving terminal is made variable by a buffer that can store a variable number of bits. This buffer, sometimes called an elastic store, can advantageously handle both the delay for frame synchronizing the data stream and the delay for compensating the phase variations due to temperature changes by providing a storage capacity in excess of one frame of bits. Accordingly, the store fills with a sufficient number of incoming bits to align the delayed framing signal at the store output with the local clock framing pulse, providing frame synchronization, and then the store reads data from the transmission link at the incoming line rate and supplies the data to the terminal at the local clock rate. The store fill thereby increases and decreases to compensate for the decrease and increase of the propagation delay of the transmission link.

Under certain conditions, such as system start-up and incoming transmission impairment, the framing signal is not received by the terminal and the store fill may drift out of frame synchronization. The receiving terminal then must initiate an operation to relocate the incoming framing signal when it appears at the output of the store and re-align this newly located framing signal with the local clock framing pulse. In accordance with known procedures, the delayed framing signal is first located, the local clock framing pulse is then located, the phase lead or lag of the delayed framing signal (with respect to the clock pulse) is determined and the difference in time is calculated, and the store fill is then increased or decreased an appropriate amount to correct the delay of the incoming framing signal to reestablish frame synchronization.

The circuitry for determining phase lead or lag and for calculating time difference is, of course, relatively complex. It is, therefore, an object of this invention to improve and simplify the resynchronizing apparatus by eliminating this complex circuitry.

SUMMARY OF THE INVENTION

The present invention provides reestablishment of frame synchronization by first determining when the delayed framing signal appears at the output of the store and by thereafter continuing to fill the store with incoming bits without reading out from the store the bit subsequent to the framing signal until the framing pulse is generated by the local clock. The resultant effect is to increase the store fill and therefore the store delay to exactly align the delayed framing signal with the local clock framing pulse.

Increasing the store fill in the manner described above or in compensating for propagation delay may result in exceeding the capacity of the store. It is therefore a feature of this invention to initiate readout of data one frame later than the bits at the store output when the store fills to capacity. This results in the discarding of a full frame of data but maintains the store output in frame synchronization.

In compensating for propagation delay, the store may also empty. It is, therefore, a feature of this invention to initiate readout of data one frame earlier than the bits at the store output when the store empties. This results in the rereading of a full frame of data but maintains the store output in frame synchronization.

In the illustrative embodiment of this invention, described hereinafter, the store comprises a multistage shift register with the incoming bits being inserted into the first stage and the delayed bits being read out of a selected one of the later stages. The later stage is selected by the count of a counter (the count being normally increased when the incoming line rate exceeds the local clock rate and decreased when the local clock rate exceeds the line rate).

When the terminal is reframing, the count is increased at the same rate as the incoming bit rate. Since, when reframing started, the delayed framing signal is at the output of the store (in the selected stage) and since the count is advanced at the incoming data rate, each of successively higher stages are selected concurrently with the shifting of the framing signal thereto. The delayed framing signal is thus shifted along to the successive stage outputs and the store fill is increased until the local framing pulse is generated, at which time the local pulse and the delayed framing signal are aligned by virtue of the fact that the framing signal is maintained at the store output.

The counter also provides the discarding and rereading of frames of data. The count is monitored and, when the count decreases to a predetermined minimum or increases to a predetermined maximum, the count is reset by increasing or decreasing, respectively, the count by a number equal to the number of bits in a frame.

The foregoing and other objects and features of this invention will be more fully understood from the following description of an illustrative embodiment thereof taken in conjunction with the accompanying drawings. Certain other aspects of the illustrative embodiment described hereinafter are also disclosed and claimed in our copending application (Ser. No. 347,855, now U.S. Pat. No. 3,829,843) entitled "Readout Circuitry for Elastic Data Bit Stores" and filed concurrently herewith.

DETAILED DESCRIPTION

Figure 1:
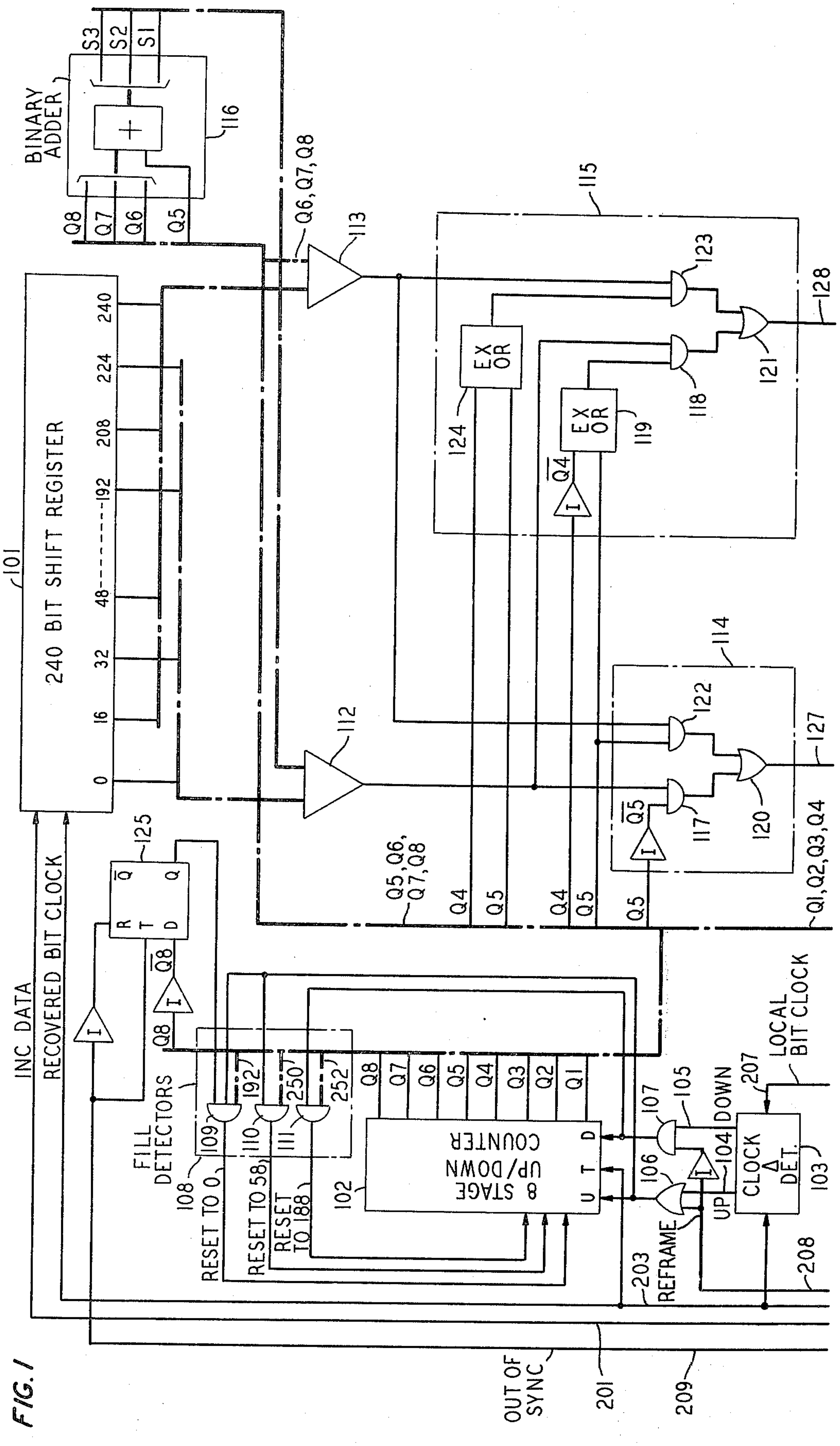
FIG. 1 and FIG. 2, when aligned vertically, show, in schematic form, a receiving terminal elastic store and the frame synchronization apparatus therefor in accordance with this invention.
Figure 2:
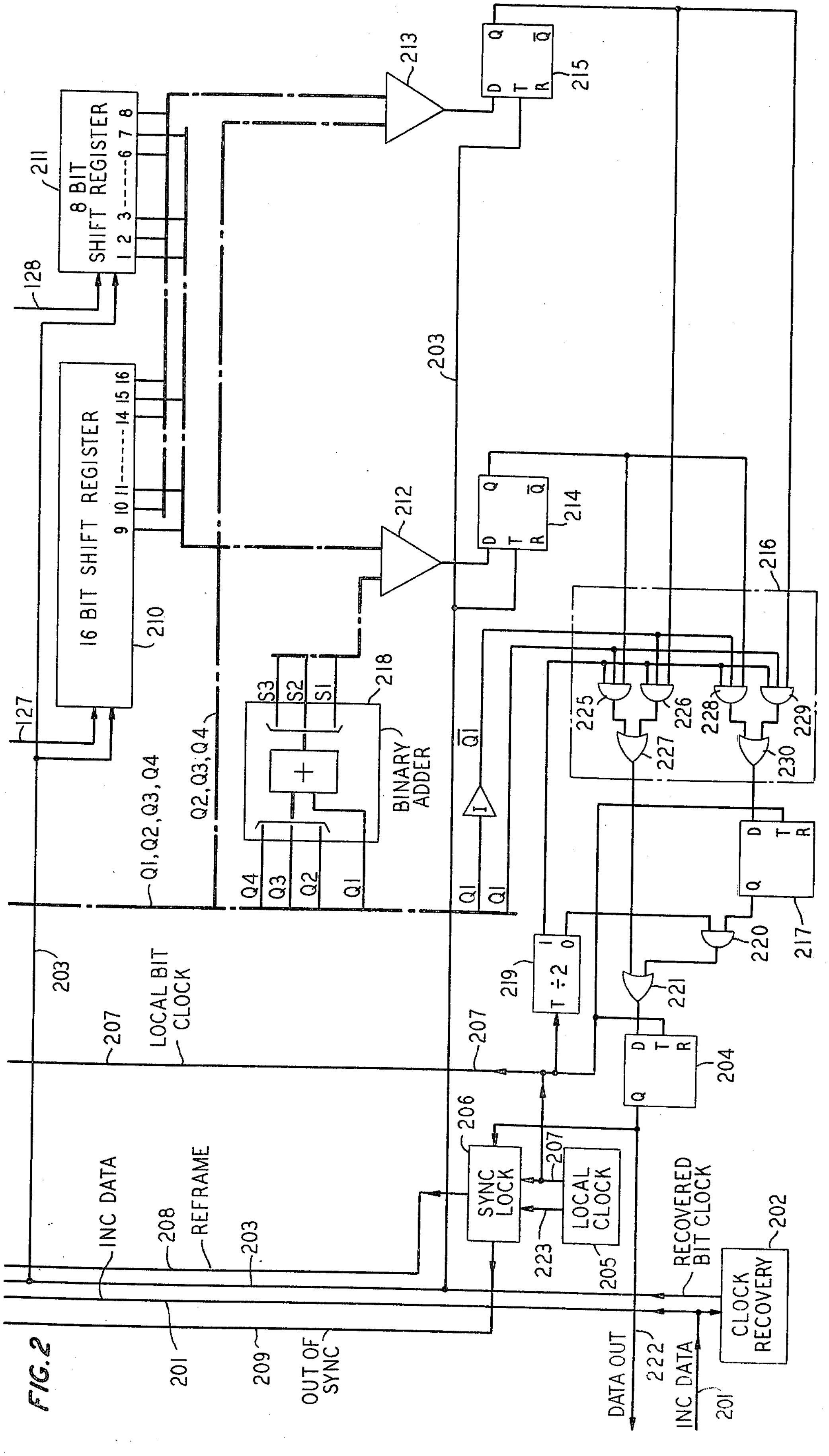

Refer now to FIGS. 1 and 2. The incoming data bit stream is received on lead 201, FIG. 2. This incoming data bit stream advantageously has a signaling rate of 1.544 megabits per second (mb/s) and contains 193-bit frames consisting of 24 8-bit bytes plus one additional bit. The frame repetition rate is, therefore, eight thousand frames per second. The last nine bits of each frame consist of the last 8-bit byte and the 193$^{rd}$ bit, all forming a 9-bit framing pattern.

The incoming data bit stream is applied via lead 201 to the input of 240-bit shift register 101 (FIG. 1) and to an input of clock recovery circuit 202. Clock recovery circuit 202 generates a 1.544 MHz bit clock, which is phase-locked with the incoming bits in the data stream. These recovered bit clock pulses are then applied through lead 203 to shift the data into and through 240-bit shift register 101 and, in addition, are used for other purposes described hereinafter.

Output data, after having been retimed and delayed as described hereinafter, is applied through steering gates, generally indicated by block 216, and toggled into flip-flops 204 and 217 by a local bit clock pulse on lead 207. The bit in flip-flop 204 is provided to the Q output of the flip-flop and passed to lead 222 to define the output data bit stream which will be processed by the local office (not shown). The next local bit clock pulse toggles the bit stored in flip-flop 217 into flip-flop 204 and this bit becomes the next output data bit.

The local bit clock pulses are generated by local clock 205 at 1.544 MHz and passed to lead 207. Local clock 205 also generates an 8 kHz local framing signal which defines the end of each frame of the output data bit stream on lead 222. The local framing signal is applied to sync lock circuit 206 by way of lead 223. It is the function of the circuitry shown in FIGS. 1 and 2 to provide appropriate retiming and delay to the incoming data bit stream to produce an output data bit stream on lead 222 which is in frame synchronism with the local framing signal, the end of the 9-bit framing pattern of the output bit stream occurring at the instant of time defined as the end-of-frame by the local framing signal.

The 1.544 MHz local bit clock stream on lead 207, the eight kHz local framing signal on lead 223 and the output data bit stream on lead 222 are applied to sync lock circuit 206. It is the function of sync lock circuit 206 to examine the 9-bit framing pattern of the output data stream and determine whether this data is properly framed in accordance with the eight kHz local framing signal. If sync lock circuit 206 determines that the output data is not in-frame, an "out-of-sync" signal is provided to lead 209 and a search is made for the framing pattern of the output data stream. When this framing pattern is located, the sync circuit provides a "reframe" signal to lead 208. When the output data is back in frame, the signals on leads 208 and 209 are removed. The details of sync lock circuit 206 are described hereinafter.

The time delay between the incoming data stream and the outgoing data stream to compensate for the difference in time between the incoming framing pattern and the local 8 kHz framing signal is principally provided by 240-bit shift register 101, together with 16-bit shift register 210 and 8-bit shift register 211 (FIG. 2). It was previously noted that the incoming data is applied to, and shifted through, shift register 101 by the recovered bit clock pulses on lead 203. Shift register 101 includes a plurality of output taps, the leftmost tap being identified as tap zero and being connected to the input of shift register 101. Succeeding taps are connected to the output of each sixteenth stage through stage 240, the taps being numbered to correspond to the stage number. Accordingly, the bits at output tap zero have a zero delay, the bits at output tap 16 have a delay of 16 bit clock pulses or 16 bit intervals and the bits at succeeding taps have further bit interval delays as defined by the tap numbers.

The bit streams at a selected one or ones of the output taps of shift register 101 are applied to either or both of shift registers 210 or 211 by multiplexer reading gates 112 and 113 and steering gates 114 and 115. The bit streams applied to registers 210 and 211 are inserted therein and shifted therethrough by the recovered bit clock pulses on lead 203. Register 211 has output taps on its several stages, each tap being identified by a numeral corresponding to the stage number. Similarly, shift register 210 has output taps connected to stages 9 through 16. Accordingly, shift register 211 provides 1 through 8 additional bit intervals delay and shift register 210 provides 9 through 16 additional bit intervals delay. The outputs of these taps are read out through multiplexer reading gates 212 and 213 to flip-flops 214 and 215. The outputs of the flip-flops are then fed through steering gates 216 to flip-flops 204 and 217, which, as previously described, constitute the output flip-flops.

It is apparent from the above paragraphs that shift register 101, together with shift register 210 or shift register 211, provide a cumulative delay up to a maximum delay of 256 data bit intervals. Shift registers 210 and 211 provide the further advantage of reducing the number of output taps necessarily required for shift register 101 to provide a fine adjustment of delay of any one of 256 bit intervals; 256 taps being normally required for shift register 101 to provide any one of 256 bit interval delays, whereas, in accordance with the specific embodiment disclosed herein, shift register 101 has 256 divided by 16, or a total of 16 taps. Other broad functions of multiplexer reading gates 112 and 113, together with steering gates 114 and 115 are to provide assurance that the data stream in shift register 101 is passed to shift registers 210 and 211, even while the readout from shift register 101 is being passed from output tap to output tap, and to provide assurance that bits in the data stream are not lost during the changes of readout from tap to tap. Finally, register 101, together with multiplexer reading gates 112 and 113, provide the coarse adjustment of the delay (increments of 16 bit intervals) while shift registers 210 and 211, together with multiplexer reading gates 212 and 213, provide the fine adjustment.

The present data bit interval delay of the circuit is defined by the count in 8-stage up/down counter 102, FIG. 1. This count is provided to output leads Q1 through Q8 of counter 102 and is passed to multiplexer reading gates 112, 113, 212 and 213 and to steering gates 114, 115 and 216 to define which output taps of the several shift registers are to be read out, thereby defining the bit interval delay of the circuit.

Up/down counter 102 contains eight stages, as previously noted, to provide binary counts from 0 to 255. The 256 counts equal the cumulative number of the stages in shift registers 101 and 210, to define the total 256 bit delay that the circuit can provide. This 256 count exceeds even the number of bits in a frame by 63 bits, the circuit having the capacity to receive the incoming data bit stream and maintain it in frame synchronization even though changes in delay of the stream relative to the local framing signal exceed a frame interval.

Although the binary output count of counter 102 substantially defines the number of data bit intervals which the data stream is delayed, it is noted, for reasons described in detail hereinafter, that the actual delay exceeds the count by 6. The delay for the count of 250 is, therefore, the maximum delay of 256 intervals. For the count of 252, the delay is recycled to 2 bit intervals; for counts of 253 to 255, the delay is 3 to 5 bit intervals; and for the count of zero, the delay is 6 bit intervals.

Counter 102 is advanced either up or down by the recovered bit clock pulse on lead 203 applied to the TOGGLE input of the counter in combination with an enabling signal applied to the input UP or DOWN terminals. Accordingly, if an enabling signal is applied to the UP terminal, a recovered bit clock pulse on lead 203 advances counter 102 by one count. Conversely, the bit clock pulse advances counter 102 down one count if input terminal DOWN is energized.

Input terminal UP is connected to the output of OR gate 106 and input terminal DOWN is connected to the output of AND gate 107. Inputs of gates 106 and 107 are connected, in turn, to clock differentiator detector circuit 103.

Clock differentiator detector circuit 103 is controlled by the recovered bit clock on lead 203 and the local bit clock on lead 207. In general, it is a function of clock differentiator detector circuit 103 to provide an UP signal on lead 104 to gate 106 when two recovered bit clock pulses occur without an intervening local bit clock pulse and to provide a DOWN signal on lead 105 to gate 107 when two local bit clock pulses occur without an intervening recovered bit clock pulse. In other words, if there is one more of the recovered bit clock pulses than the local bit clock pulses, clock differentiator detector circuit 103 energizes UP lead 104 to energize terminal UP of counter 102 by way of gate 106. Counter 102 thus advances one count to provide an additional clock bit interval delay to compensate for the additional incoming bit. Conversely, if there is one more of the local bit clock pulses than the recovered bit clock pulses, clock differentiator detector circuit 103 energizes DOWN lead 105 to energize, in turn, DOWN terminal of counter 102 by way of gate 107. Counter 102 thereby counts down one count to reduce the delay of the incoming stream and thereby compensate for the additional local bit clock pulse.

Counter 102 may be advanced either up or down to its maximum or minimum count, which we have previously disclosed to be the counts of 250 and 252. In either event, an arrangement is made to reset the count by subtracting or adding a frame interval which, as previously noted, equals 193 bit intervals. This resetting by a frame interval maintains the circuit in frame synchronization.

The resetting of the counter is provided by the fill detectors, generally indicated by block 108. Fill detectors 108 provide three output leads connected to up/down counter 102; the output leads being designated in FIG. 1 as: Reset-To-0; Reset-To-58; and Reset-To-188. Each of these leads extends to the several stages in up/down counter 102 and the energization of any one of these leads in conjunction with a clock pulse on the TOGGLE input of clock 102 results in the operation of the several stages to states which define the binary count identified by the lead designation. In general, when counter 102 advances to its maximum count of 250 and clock differentiator detector 103 operates to further advance the counter, as previously described, fill detectors 108 energize the Reset-To-58 lead, whereby counter 102 is reset to the binary count of 58. Since the count of 58 is 193 less than the count of 251, the delay of the circuit is thus modified by a full frame interval.

The energization of Reset-To-58 lead is provided by gate 110 in fill detectors 108. The Q1 through Q8 outputs of counter 102 extend to inputs of gate 110 and the gate is enabled when the count is 250. The energization of lead 104 by clock differentiator detector 103 to provide an additional advance is passed through gate 106, as previously described, and applied to gate 110. This results in the resetting of counter 102 to the binary count of 58.

In a similar manner, counter 102 is reset to the count of 188 when it reaches the minimum count. This resetting is provided by gate 111, which is enabled by output leads Q1 through Q8 of counter 102 when the counter reaches the minimum count of 252. A determination by clock differentiator detector 103 that an additional reduction in count is necessary results in the energization of lead 105. This signal is applied through gate 107 to gate 111 and thus is passed through gate 111 to reset the counter to the binary count of 188. Since the count was being downcounted from the count of 252, the resetting to the binary count of 188 provides an additional delay of one frame (since 188 plus (256–215) equals 193), whereby the circuit is maintained in frame synchronization.

The third gate in fill detectors 108; namely, gate 109, is utilized during "out-of-sync" conditions to maintain the counter in the approximate delay position that was provided prior to the "out-of-sync" condition. It is recalled that the total capacity of delay of the circuit exceeds a frame interval (193 bit intervals). Consequently, if the circuit establishes that frame synchronization is achieved with a relatively small delay of, for example, 20 bit intervals, the circuit would also recognize frame synchronization if the delay should be suddenly changed to 193 plus 20, or 213 bit intervals. It is the function of gate 109, together with flip-flop 125, to establish a relatively small delay when synchronization is reestablished if the delay was small before the loss of synchronization.

Assume now that synchronization is lost and the present delay is relatively small. Sync lock circuit 206 applies an enabling signal to lead 209. At the same time, with a small delay, counter 102 provides a zero bit to output lead Q8 and this bit is inverted and applied to the "D" input of flip-flop 125. The out-of-sync signal on lead 209, therefore, toggles flip-flop 125 from its normal RESET condition to the SET condition. Flip-flop 125 thereupon applies by way of its Q output an enabling potential to gate 109. When the framing pattern is located, sync lock circuit 206 applies an enabling signal to REFRAME lead 208, as previously described. The enabling signal is inverted to disable gate 107, precluding the application of an enabling signal to the DOWN terminal of counter 102. At the same time, the enabling signal on REFRAME lead 208 applies an enabling potential through gate 106 to the UP terminal of counter 102. Counter 102 thereupon steadily advances in response to each recovered bit clock pulse on lead 203 until the count of 192 is achieved. At the count of 192 the Q1 through Q8 leads are appropriately energized to enable gate 109 to provide a signal to the Reset-To-0 lead. This reset counter 102 to the binary count of zero, which is the near minimum count. Counter 102, therefore, continuously advances to the binary count of 192 and is recycled to the count of zero, precluding any delay exceeding 192 bit intervals. Thereafter, when synchronization is achieved, the reframing signal is removed, permitting counter 102 to operate in the normal manner and the out-of-sync signal is terminated. The termination of the out-of-sync signal is inverted to provide a resetting signal to flip-flop 125 to return it to its normal RESET condition.

In the event that a count exceeds the half count of 128 when the out-of-sync condition is detected, a "1" bit is provided to output lead Q8 of counter 102. In this event, an enabling signal is now provided to the "D" input of flip-flop 125, the flip-flop is not toggled to the SET condition and gate 109 is not enabled. During reframing, counter 102 advances, as previously described, but in this case the advance is to the count of 250, whereupon it is reset by gate 110 to the count of 58. Counter 102 is therefore driven through the counts of 58 through 250 to achieve a relatively higher count when frame synchronization is re-achieved.

As previously noted, multiplexer reading gates 112 and 113 are controlled by the count in counter 102 to read the data stream at a selected one or ones of the output taps of register 101. As seen in FIG. 1, multiplexer reading gates 112 are connected to tap zero of register 101 and to each $32^{nd}$ numbered tap thereafter up to tap 224. Multiplexer reading gates 113 are connected to tap 16 and to each $32^{nd}$ numbered tap thereafter up to tap 240. The reading gates are therefore connected to alternate ones of the taps.

The addressing for multiplexer reading gates 112 is provided by the output of binary adder 116. The binary adder adds the fifth bit (Q5) of the up/down counter number to the sixth through eighth bits (Q6 through Q8), discarding the most significant bit of the result. The least significant 3-bit binary number output of the binary adder is passed to output leads S1 through S3. Some of the typical binary number outputs are zero for counts zero through 15 of up/down counter 102; one for counts 16 through 47; two for counts 48 through 79 of the up/down counter; seven for counts 208 through 239; and zero again for counts 240 through 255.

As the binary number output of binary adder 116 advances, multiplexer reading gates 112 correspondingly advance to read higher numbered ones of the output taps of 240-bit shift register 101. For the binary number zero output of adder 116, multiplexer reading gates 112 read output tap zero; for binary number one, multiplexer reading gates 112 read output tap 32; for number two, the multiplexer reading gates read output tap 64; and for number seven, the reading gates read output tap 224.

Multiplexer reading gates 113 are connected to output leads Q6, Q7 and Q8 of counter 102 and are, therefore, addressed by the three most significant bits (6, 7 and 8) of the up/down counter number. As the number formed by these three most significant bits advances, reading gates 113 advance to read higher numbered ones of the output taps of 240-bit shift register 101. Accordingly, multiplexer reading gates 113 read output tap 16 of 240-bit shift register 101 during counts zero through 31 of up/down counter 102; read output tap 48 during counts 32 through 63 of the up/down counter; and read output tap 240 during counts 224 through 225. Therefore, it can be seen that multiplexer reading gates 112 and 113 advance in overlapping relationship to higher numbered taps of 240-bit shift register 101 as the count in up/down counter 102 increases and, similarly, back down in overlapping relationship to the lower numbered taps as the count in the up/down counter decreases.

The output of the multiplexer reading gates 112 is connected to 16-bit shift register 210 by way of steering gates 114 and lead 127. The output of gates 112 is also connected to the input of 8-bit shift register 211 by way of steering gates 115 and lead 128.

Steering gates 114 include AND gates 117 and 122 and OR gate 120. The output of reading gates 112 is connected to AND gate 117, whose output is passed through OR gate 120 to lead 127. AND gate 117 is enabled by bit five inverted ($\overline{Q5}$) of the up/down counter number. Thus for each 32 counts of the up/down counter (such as counts zero to 31, 32 to 63, et cetera), the output of reading gates 112 is passed to register 210 for the initial 16 counts (such as for counts zero to 15, 32 to 47, et cetera).

Steering gates 115 include EXCLUSIVE OR gates 119 and 124, AND gates 118 and 123 and OR gate 121. The output of reading gates 112 is connected to AND gate 118 whose output is passed through OR gate 121 to lead 128. AND gate 118 is enabled by EXCLUSIVE OR gate 119 which, in turn, is enabled by bit four inverted ($\overline{Q4}$) and bit five (Q5) of the up/down counter number. Thus, for each 32 counts of the up/down counter, the output of reading gates 112 is passed to register 211 for the initial eight counts (such as for counts zero to 7, 32 to 39, et cetera) and for the final eight counts (such as for counts 24 to 31, 56 to 63, et cetera).

The output of multiplexer reading gates 113 is also connected to the input of 16-bit shift register 210 by way of steering gates 114 and lead 127. In addition, the output of reading gates 113 is connected to 8-bit shift register 211 by way of reading gates 115 and lead 128.

In steering gates 114, the output of reading gates 113 is connected to AND gate 122. The output of AND gate 122 is passed through OR gate 120 to lead 127. AND gate 122 is enabled by bit five (Q5) of the up/down counter number. Thus, for each 32 counts of the up/down counter, the output of reading gates 113 is passed to register 210 for the final 16 counts (such as for counts 16 to 31, 48 to 63, et cetera).

In steering gates 115, the output of reading gates 113 is connected to AND gate 123. The output of AND gate 123 is passed through OR gate 121 to lead 128. AND gate 123 is enabled by EXCLUSIVE OR gate 124 which, in turn, is enabled by bit four (Q4) and bit five inverted ($\overline{Q5}$) of the up/down counter number. Thus, for each 32 counts of the up/down counter, the output of reading gates 113 is passed to register 211 for the second group of eight counts (such as for counts 8 to 15, 40 to 47, et cetera) and for the third group of eight counts (such as for counts 16 to 23, 48 to 55, et cetera).

Table I, below, summarizes typical counts of up/down counter 102, showing the resultant connection between output taps of shift register 101 and inputs of shift registers 210 and 211. The first column of Table I defines typical groups of binary values of the counts. The second and third columns disclose the tap number of register 101 read by reading gates 112 when counter 102 is advanced to each of the groups of counts and the register or registers 210 and/or 211, which are receiving the output of reading gates 112 (X denoting that neither register 210 nor register 211 is receiving from gates 112). The fourth and fifth columns disclose the tap number read by reading gates 113 with counter 102 at each of the groups of counts and the register (210 and/or 211) receiving the outputs of reading gates 113.

TABLE I

| | Gates 112 | | Gates 113 | |
|---|---|---|---|---|
| Binary Values of Counts | Reads Reg. 101 Tap. No. | Writes into Register | Reads Reg. 101 Tap No. | Writes into Register |
| 252–255 | 0 | 211 | 240 | 210 |
| 0–7 | 0 | 211 & 210 | 16 | X |
| 8–15 | 0 | 210 | 16 | 211 |
| 16–23 | 32 | X | 16 | 211 & 210 |
| 24–31 | 32 | 211 | 16 | 210 |
| 32–39 | 32 | 211 & 210 | 48 | X |
| 40–47 | 32 | 210 | 48 | 211 |
| 48–55 | 64 | X | 48 | 211 & 210 |
| 56–63 | 64 | 211 | 48 | 210 |
| 64–71 | 64 | 211 & 210 | 80 | X |
| 72–79 | 64 | 210 | 80 | 211 |
| 80–87 | 96 | X | 80 | 211 & 210 |
| 88–95 | 96 | 211 | 80 | 210 |
| 96–103 | 96 | 211 & 210 | 112 | X |
| 104–111 | 96 | 210 | 112 | 211 |

TABLE I-Continued

| | Gates 112 | | Gates 113 | |
|---|---|---|---|---|
| Binary Values of Counts | Reads Reg. 101 Tap. No. | Writes into Register | Reads Reg. 101 Tap No. | Writes into Register |
| 112–119 | 128 | X | 112 | 211 & 210 |
| 120–127 | 128 | 211 | 112 | 210 |
| 208–215 | 224 | X | 208 | 211 & 210 |
| 216–223 | 224 | 211 | 208 | 210 |
| 224–231 | 224 | 211 & 210 | 240 | X |
| 232–239 | 224 | 210 | 240 | 211 |
| 240–247 | 0 | X | 240 | 211 & 210 |
| 248–250 | 0 | 211 | 240 | 210 |

The several stages of 16-bit shift register 210 and 8-bit shift register 211 are read by multiplexer reading gates 212 and 213. Reading gates 213 are controlled by addresses developed by the Q2, Q3 and Q4 outputs of up/down counter 102 and, in accordance therewith, read out a selected one of the even numbered stages in shift register 211 or a selected one of the even numbered stages from stages 10 to 16 in shift register 210. Reading gates 212 are controlled by address signals derived from the count of up/down counter 102 and, in accordance therewith, read out a selected one of the odd numbered stages in shift register 211 or a selected one of the odd numbered stages from stages 9 to 15 in shift register 210.

The address for multiplexer 212 is derived from the output of binary adder 218, which adds the number formed by the second through fourth bits (Q2, Q3 and Q4) of up/down counter 102 to the number formed by the first bit (Q1) of the up/down counter, discarding the most significant bit of the result.

The least significant 3-bit number output of binary adder 218 is passed via output leads S1 through S3 to reading gates 212. When up/down counter 102 is at any one of counts zero, 15 to 16, 31 to 32, 47 to 48, or 255, et cetera, the binary number output of binary adder 218 is zero. When up/down counter 102 is at any one of counts one to two, 17 to 18, 33 to 34, 241 to 242, et cetera, the binary number output is one. Similarly, other counts of up/down counter 102 result in other binary number outputs of binary adder 218 from three to fifteen.

As the binary number output of binary adder 218 advances, multiplexer reading gates 212 correspondingly advance to read higher numbered ones of the output taps of registers 210 and 211. For the binary number zero output of adder 218, reading gates 212 read output tap 5 of register 211; for binary number one, reading gates 212 read output tap 7; for binary number two, reading gates 212 read output tap 9 of register 212, et cetera.

Multiplexer reading gates 213 are addressed by the second, third and fourth bits (Q2, Q3, Q4) of the output number of up/down counter 102. When up/down counter 102 is at any one of counts zero to one, 16 to 17, or 240 to 241, et cetera, the binary number formed by these bits of the count is zero. Similarly, the number formed increases up to 15 for other counts of counter 102. As the formed number advances, reading gates 213 correspondingly advance to read higher numbered taps of registers 210 and 211 starting, for number zero, with output tap 6 of register 211.

It can, therefore, be seen that reading gates 112 and 113 advance in overlapping relationship to higher numbered taps in register 211 and then in register 210 and then, again, in register 211 as the count in up/down counter 102 increases and back down in overlapping relationship as the counter number decreases. Table II, below, summarizes typical counts of up/down counter 102, showing the resultant readouts of output taps of registers 210 and 211. The numbers under the first heading in the Table define typical binary values of the counts and subsequent columns disclose the tap number and register therefore read by reading gates 212 and 213 when the counter advances to each of the counts.

Steering gates 216 include AND gates 225, 226, 228 and 229 and OR gates 227 and 230. If the count of counter 102 is an even number, the first bit inverted ($\overline{Q1}$) enables gates 226 and 228. The Q output of flip-flop 215 is passed through AND gate 226 and OR gates 227 and 221 to the "D" input of flip-flop 204 and the Q output of flip-flop 214 is passed through AND gate 228 and OR gate 230 to flip-flop 217 when the AND gates are enabled by the "1" output of flip-flop 219. Flip-flop 219 is toggled by the local bit clock on lead 207 and functions as a divide-by-two counter. AND

TABLE II

| Binary Value of Counts | Mux Gates 213 Reads | | Mux Gates 212 Reads | |
|---|---|---|---|---|
| | Register | Tap | Register | Tap |
| 0, 16, 32, 48, 64, 80, 96, 112, . . . 224, 240 | 211 (8-bit) | 6 | 211 (8-bit) | 5 |
| 1, 17, 33, 49, 65, 81, 97, 113, . . . 225, 241 | 211 | 6 | 211 | 7 |
| 2, 18, 34, 50, 66, 82, 98, 114, . . . 226, 242 | 211 | 8 | 211 | 7 |
| 3, 19, 35, 51, 67, 83, 99, 115, . . . 227, 243 | 211 | 8 | 210 (16-bit) | 9 |
| 4, 20, 36, 52, 68, 84, 100, 116, . . . 228, 244 | 210 (16-bit) | 10 | 210 | 9 |
| 5, 21, 37, 53, 69, 85, 101, 117, . . . 229, 245 | 210 | 10 | 210 | 11 |
| 6, 22, 38, 54, 70, 86, 102, 118, . . . 230, 246 | 210 | 12 | 210 | 11 |
| 7, 23, 39, 55, 71, 87, 103, 119, . . . 231, 247 | 210 | 12 | 210 | 13 |
| 8, 24, 40, 56, 72, 88, 104, 120, . . . 232, 248 | 210 | 14 | 210 | 13 |
| 9, 25, 41, 57, 73, 89, 105, 121, . . . 233, 249 | 210 | 14 | 210 | 15 |
| 10, 26, 42, 58, 74, 90, 106, 122, . . . 234, 250 | 210 | 16 | 210 | 15 |
| 11, 27, 43, 59, 75, 91, 107, 123, . . . 235, — | 210 | 16 | 211 (8-bit) | 1 |
| 12, 28, 44, 60, 76, 92, 108, 124, . . . 236, 252 | 211 (8-bit) | 2 | 211 | 1 |
| 13, 29, 45, 61, 77, 93, 109, 125, . . . 237, 253 | 211 | 2 | 211 | 3 |
| 14, 30, 46, 62, 78, 94, 110, 126, . . . 238, 254 | 211 | 4 | 211 | 3 |
| 15, 31, 47, 63, 79, 95, 111, 127, . . . 239, 255 | 211 | 4 | 211 | 5 |

It will be observed from Table II that multiplexer reading gates 212 and 213 simultaneously read out adjacent taps of shift register 210 or register 211 or read out a final tap of one register and an initial tap of the other for each count of up/down counter 102. It will also be observed that if the count is an even number, multiplexer 213 reads the higher numbered tap supplying the prior one of the two data bits, whereas if up/down counter 102 is in an odd count, multiplexer 212 reads the prior bit in the higher numbered tap.

The outputs to multiplexers 212 and 213 are applied to the "D" inputs of flip-flops 214 and 215. The bit stream outputs of the reading gates are toggled into the flip-flops by the recovered bit clock pulse on lead 203. The Q outputs of flip-flops 214 and 215 are then passed to steering gates 216 for application to flip-flops 204 and 217.

Steering gates 216 are controlled by the first bit and first bit inverted (Q1 and $\overline{Q1}$) outputs of counter 102 and the output of flip-flop 219. When the count in the counter is an even number, flip-flop 215 receives the prior bit from gates 213 and the output of flip-flop 215 is steered into flip-flop 204. At the same time, the output of flip-flop 214 is steered into flip-flop 217. The output data is then first derived from flip-flop 204, as previously described, and during the next bit interval the output of flip-flop 217 is inserted into flip-flop 204 to provide the next output data bit. If the count of counter 102 is an odd number and flip-flop 214 is receiving the prior bit of the incoming stream, steering gates 216 pass the output of flip-flop 214 into flip-flop 204 and pass the output of flip-flop 215 into flip-flop 217, thereby reversing the sequence of the output bits stored in flip-flop 214 and flip-flop 215. The prior bit in the stream is therefore passed first to output lead 222 followed by the subsequent bit.

gates 226 and 228, together with AND gates 225 and 229, therefore receive alternate enabling and disabling potentials from flip-flop 219 for successive bit intervals. Thus, at the end of one bit interval, flip-flops 214 and 215 pass bits to flip-flops 204 and 217, flip-flop 214 passing the bit therein to output lead 222 during the next bit interval.

The output of flip-flop 217 is passed through AND gate 220 and OR gate 221 to flip-flop 214. AND gate 220 is enabled by the "0" output of flip-flop 219 and is therefore enabled every other bit interval, differing from the intervals when AND gates 225, 226, 227 and 228 may be enabled. Thus, the output of flip-flop 217 is passed to flip-flop 204 during the "next bit interval" noted above and toggled into the flip-flop at the end of this next bit interval by the clock pulse on lead 207. The output of flip-flop 204 is passed to output lead 222 during the bit interval following the next bit interval and, at the same time, the outputs of flip-flops 214 and 215 are again applied through steering gates 216.

If the binary count of counter 102 is an odd number, output Q1 enables gates 225 and 229. During every other one of the bit intervals the output of flip-flop 214 is passed to flip-flop 204 via AND gate 225 and OR gates 227 and 221 and the output of flip-flop 215 is passed to flip-flop 217 via AND gate 229 and OR gate 230. The bits passed to flip-flops 204 and 217 are then successively applied to output lead 222 in the same manner as described above.

As a general review, the following is a summary of the delay provided to the data bit stream for each of several counts of up/down counter 102. Consider first a count of eighteen. Referring to Table I, it is seen that multiplexer reading gates 113 are reading tap 16 of shift register 101 and feeding the bit stream on this tap through steering gates 114 and 115, simultaneously, to the inputs of shift register 210 and shift register 211.

Accordingly, the bit in the first stage of shift register 210 has a delay of 16 + 1 bit intervals, the bit in the ninth stage has a delay of 25 bit intervals, et cetera, down to the bit in the sixteenth stage having a delay of 32 bit intervals. At the same time, the bits in the eight stages of shift register 211 have delays of from 17 to 24 bit intervals.

Refer now to Table II. With counter 102 in the count of 16, reading gates 212 read the seventh tap of shift register 211 while reading gates 213 read the eighth tap which, with respect to the seventh tap, supplies the earlier bit in the data bit stream. This earlier bit is delayed by 24 bit intervals.

Assume now that up/down counter 102 advances one count to 17. Multiplexer reading gates 113 continue to read tap 16 of shift register 101, feeding shift registers 210 and 211. Multiplexer reading gates 213 continue to read tap 8 of shift register 211. Reading gates 212, however, now read tap 9 of shift register 210. The bit in the ninth stage is the earlier bit in the stream. The circuit is now providing a delay of 25 bit intervals.

As the count in counter 102 is advanced upward through the next several numbers, reading gates 212 and 213 scan higher numbered taps in shift register 210. Assume that the count advances to number 24. Table I indicates, for the count of 24, that reading gates 113 continue to read the bit stream on tap 16 of shift register 101. These bits, however, are now applied only through steering gates 114 to shift register 210. Reading gates 112 now read the bit stream at output tap 32 of shift register 101 and feed these bits through steering gates 115 to shift register 211. The bits in shift register 211 have delays of 33 to 40 data bit intervals, while the bits at taps 9 through 16 of register 210 continue to be delayed by 25 to 32 bit intervals. At count 24, reading gates 213 read the earlier bit at tap 16 and the stream is delayed 32 data bit intervals.

Proceeding on to count 27, Table I discloses that reading gates 213 read tap 16 of shift register 210, deriving therefrom a bit stream having a delay of 32 bit intervals. At the same time, reading gates 212 read the bit stream at the first tap of shift register 211, deriving therefrom the bit having the delay of 33 bit intervals. The bits at the first tap of shift register 211 are the earlier received bits; the present circuit delay is therefore 33 bit intervals.

As can be seen from the above description, 240-bit shift register 101 includes a plurality of spaced taps to provide coarse delay of the data bit stream. Reading gates 112 and 113 are controlled by the count in up/down counter 102 and, as the count number increases, the reading gates periodically switch to scan higher numbered taps to increase the coarse delay. Shift register 211 includes a tap for each stage and shift register 210 has a tap for the latter eight of sixteen stages to provide fine delay of the data bit stream. Steering gates 114 and 115 are controlled by the count in counter 102 and, for each coarse adjustment and periodically between coarse adjustments, steer the outputs of reading gates 112 and 113 to registers 210 and 211 to provide cumulative coarse and fine delay. Finally, reading gates 212 and 213 are controlled by increases in the count and scan successive taps of registers 210 and 211 to provide cumulative coarse and fine delay defined by the count in counter 102, shifting from the highest tap of one register to the lowest tap of the other register to compensate for the coarse delay adjustments.

In a similar manner when the count in up/down counter 102 decreases, reading gates 112 and 113 periodically switch to lower numbered taps, steering gates 114 and 115 steer the outputs of reading gates 112 and 113 to registers 210 and 211 in reverse sequence from the sequence described above, and reading gates 212 and 213 scan taps of registers 210 and 211, switching to successive lower numbered taps and shifting from the lowest tap of one register to the highest tap of the other register. The delay of the data stream is thereby reduced in an inverse manner as the delay is increased.

Figure 3:
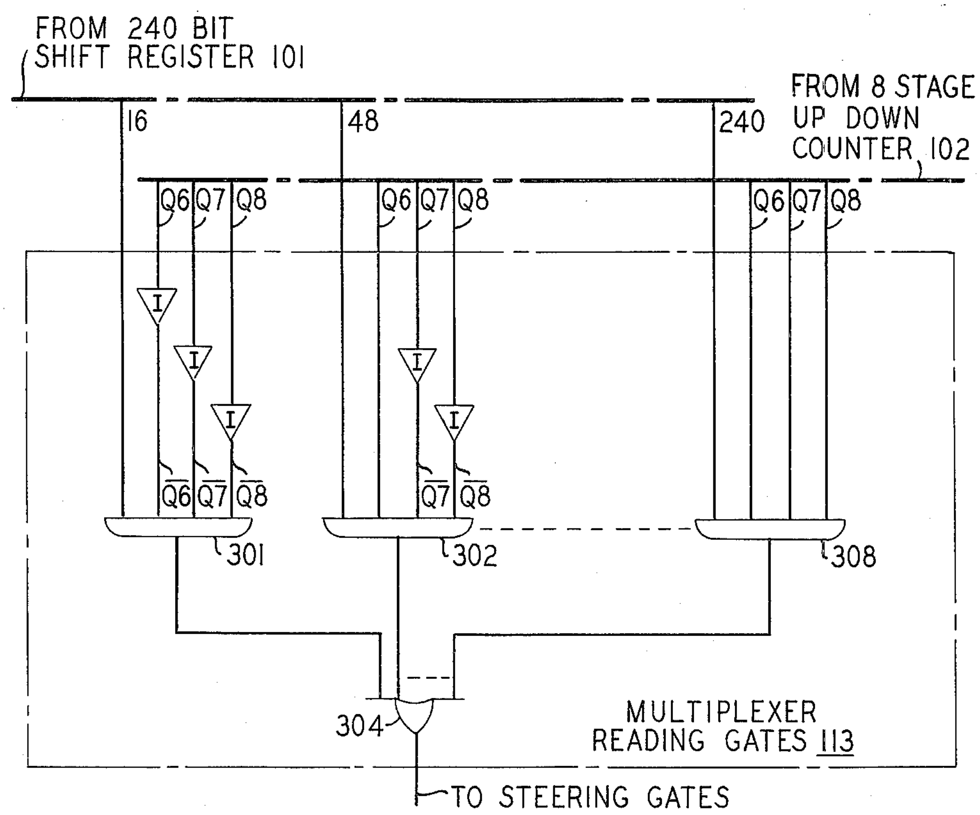
FIG. 3 discloses the circuit details of typical reading gates which provide selection of stages of the store.

The components of multiplexer reading gates 113 include eight AND gates and an OR gate, AND gates 301, 302 and 308 and OR gate 304 being shown in FIG. 3. Successive ones of the AND gates are connected to successive ones of the taps of shift register 101. More specifically, gate 301 is connected to tap 16; gate 302 is connected to tap 48; et cetera, on to gate 308, which is connected to tap 240. The $6^{th}$, $7^{th}$ and $8^{th}$ bits (Q6, Q7, Q8) and/or the inversions thereof ($\overline{Q6}$, $\overline{Q7}$, $\overline{Q8}$) are applied to each of the gates to provide addressing. As seen in FIG. 3, the inversion of bits 6, 7 and 8 are applied to gate 301, whereby this gate is enabled when all the bits are zero and, when enabled, pass the data stream on tap 16 through OR gate 304 to steering gates 114 and 115. Similarly, other binary numbers formed by bits 6, 7 and 8 enable other ones of AND gates 302 through 308 and, when enabled, these gates pass the data stream from the tap connected thereto through gate 304 to the steering gates.

Multiplexer reading gates 112, 212 and 213 are arranged in a manner similar to multiplexer reading gates 113. Each of the multiplexer reading gates includes eight AND gates and an OR gate, each AND gate being enabled by a specific binary number count on the addressing leads connected thereto to pass the data stream on the shift register tap connected thereto through the corresponding OR gate to the output port of the multiplexer reading gates.

Figure 4:
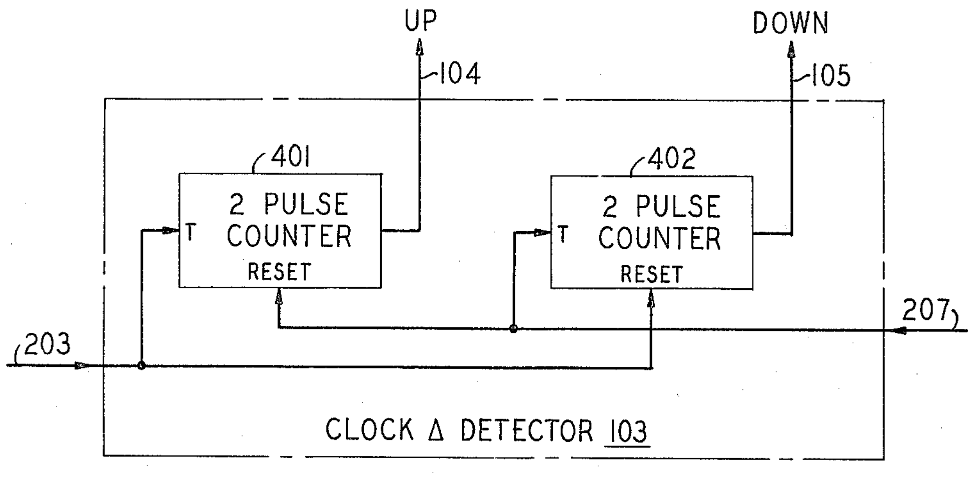
FIG. 4 shows circuit details of apparatus which compares the number of incoming bits (to be inserted in the store) with the number of readout bits (as defined by the local clock)

Clock differentiator detector 103 principally includes two pulse counters 401 and 402, as seen in FIG. 4. Pulse counter 401 is toggled by the recovered bit clock pulse on lead 203 and reset to its initial count by the local bit clock pulse on lead 207. In the event that there are two recovered bit clock pulses without an intervening local bit clock pulse, counter 401 achieves the count of two and provides at its output the UP signal, which is passed to lead 104. In a similar manner, counter 402 is toggled by the local bit clock pulse on lead 207 and reset to its initial count by the recovered bit clock pulse on lead 203. Thus, two local bit clock pulses without an intervening recovered bit clock pulse advances counter 402 to the count of two, providing at its output the DOWN signal, which is passed to lead 105.

Figure 5:
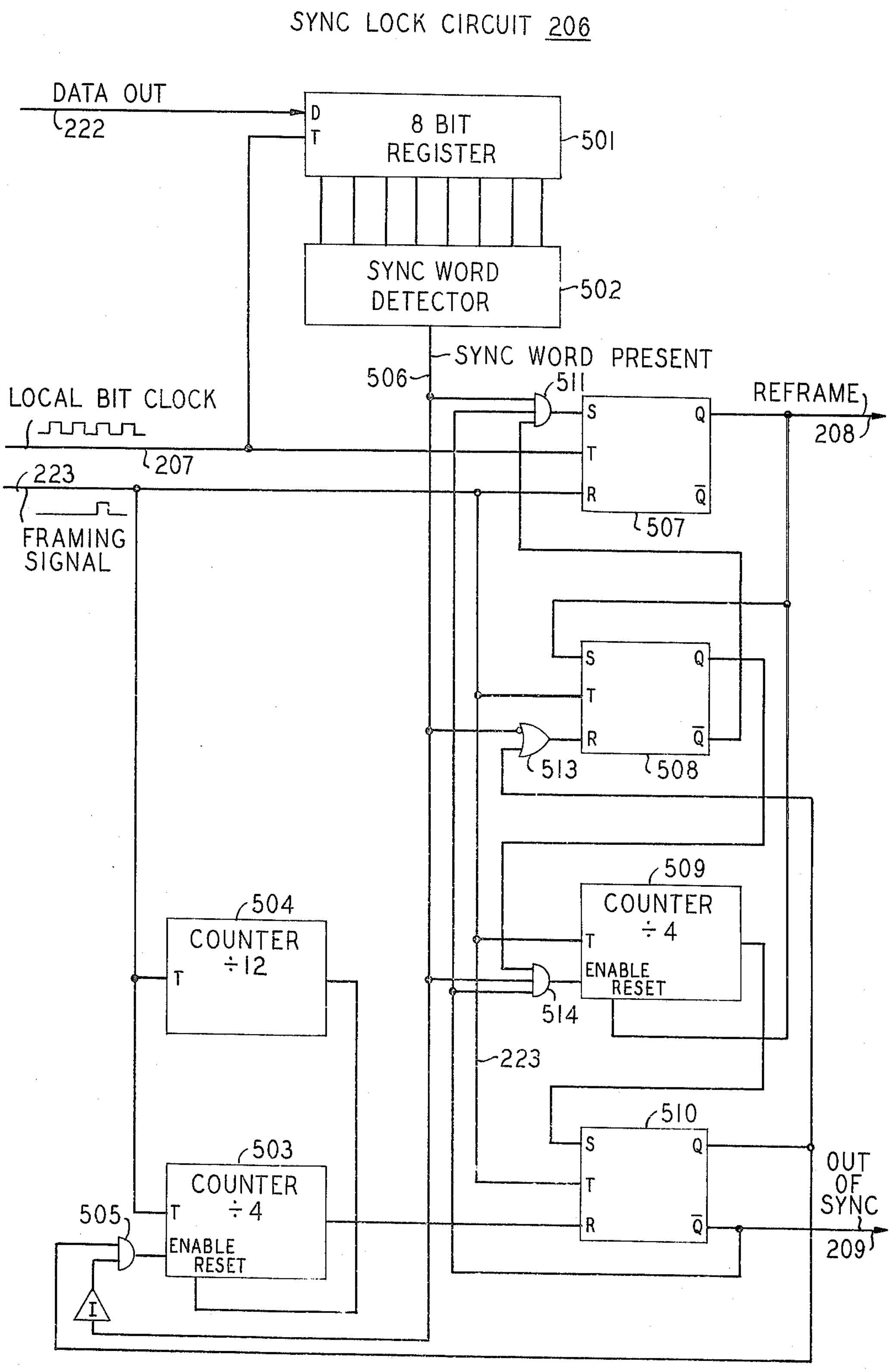
FIG. 5 depicts circuit details of the apparatus that controls frame synchronization.

Refer now to FIG. 5, disclosing details of sync lock circuit 206. In the normal initial condition, flip-flops 507 and 508 are in the RESET condition, and flip-flop 507 is not providing an energizing signal potential to REFRAME lead 208. Flip-flop 510 is in the SET condition and the latter flip-flop is not providing an energizing signaling potential to OUT-OF-SYNC lead 209. Output data on lead 222 is applied to 8-bit shift register 501. This output data is then toggled into and shifted through the register by the terminal portion of each bit clock pulse on lead 207. The bits in the several stages of register 501 are monitored by sync word detector 502. When the framing pattern has been shifted into register 501, sync word detector 502, recognizing this pattern, applies an enabling potential to lead 506. This enabling potential is inverted and applied to AND gate 505 and AND gate 505, in turn, provides a disabling potential to 4-pulse counter 503. So long as the framing pattern is received immediately prior to the framing signal on lead 223, counter 503 is disabled when the framing signal pulse is applied to the TOGGLE input of the counter, precluding its counting operation. Sync lock circuit 206 is thereby maintained in its normal initial condition.

Assume now that an out-of-frame condition arises wherein the framing signal on lead 223 is not aligned with the end of the framing pattern in the outgoing data on lead 222. In the event, sync word detector 502 does not provide an enabling potential to lead 506 when the framing signal pulse is on lead 223. By virtue of inversion, the absence of the enabling potential becomes an enabling potential passed to AND gate 505. The other input to AND gate 505 is connected to the Q outputs of flip-flop 510. Since flip-flop 510 is normally SET, AND gate 505 is enabled and enables, in turn, counter 503, releasing the counter to be toggled by the framing signal on lead 223. Counter 503 is thus advanced to the count of one. At the same time, it is to be noted, the framing signal advances the count of 12-pulse counter 504.

If it be assumed that when the next framing signal is received on lead 223 the circuit is again in-frame, sync word detector 502 energizes lead 506 and counter 503 is not advanced. The framing signal, however, again advances the count of counter 504. At the end of twelve frames, counter 504 advances to the count of twelve and provides an output pulse which resets counter 503. This returns counter 503 to its initial count.

Assume now that four incorrect framing patterns are detected prior to the twelve frame interval. Under this condition, it is presumed that the circuit has lost framing synchronization. Counter 503 advances to the count of four without being reset by counter 504. Counter 503 thereupon applies an enabling signal to its output and this enabling signal is passed to the RESET input of flip-flop 510. The flip-flop is then toggled to the RESET condition by the next framing signal.

The resetting of flip-flop 510 applies an energizing signal to its $\overline{Q}$ output. This is passed to OUT-OF-SYNC lead 209 to initiate the "out-of-sync" operation previously described. At the same time, the enabling potential on the $\overline{Q}$ output of flip-flop 510 partially enables AND gate 514. In addition, the $\overline{Q}$ output of flip-flop 510 fully enables AND gate 511 since the other input lead of the AND gate is connected to the $\overline{Q}$ output terminal of flip-flop 508, which is normally in the RESET condition.

During the next frame, sync word detector 502 is monitoring register 501 for the frame pattern. When the framing pattern is discovered, detector 502 applies an enabling potential to lead 506. This is passed through AND gate 511 to the SET input of flip-flop 507. The termination of the next local bit clock pulse on lead 207 then toggles flip-flop 507 to the SET condition. In this condition, flip-flop 507 applies an energizing potential by way of its output Q terminal to REFRAME lead 208. This provides the reframing operation previously described, which modifies the delay of the data bit stream to align the framing pattern of the output stream with the local framing signal. The setting of flip-flop 507 and the consequent application of an enabling potential to its output Q terminal also provides an enabling potential to the SET input of flip-flop 508.

The next framing signal on lead 223 applies an enabling potential to the RESET input terminal of flip-flop 507. The termination of the framing signal toggles flip-flop 508 to the SET condition and the concurrent termination of the local bit clock pulse on lead 207 toggles flip-flop 507 back to the RESET condition, removing the signaling potential from REFRAME lead 208. The reframing operation is terminated as the framing pattern is theoretically aligned with the framing signal.

With flip-flop 508 SET and flip-flop 510 RESET, a search proceeds for four more framing patterns in appropriate frame positions of the output bit stream. The potentials on the Q output of flip-flop 508 and the $\overline{Q}$ output of flip-flop 510 partially enable AND gate 514. When sync word detector 502 detects the framing pattern and applies a potential to lead 506, AND gate 514 is fully enabled, enabling in turn 4-pulse counter 509 for one bit interval following the detection of the pattern. If the framing signal is applied to lead 222, indicating frame alignment, the termination of the signal then toggles counter 409 to a count of one.

Assume now that the framing pattern is not in the appropriate frame position of the bit stream. In this event, the lack of the framing pattern provides no signaling potential to lead 506. This absence of a signaling potential is inverted by OR gate 513 to apply an enabling potential to the RESET input terminal of flip-flop 508. The termination of the framing signal thereupon toggles the flip-flop to the RESET condition, disabling counter 509. With flip-flops 508 and 510 RESET, AND gate 511 is again partially enabled. The local bit clock thereupon sets flip-flop 507 and flip-flop 507 resets counter 509 and initiates a new search for the framing pattern and a new reframing operation.

If it is assumed, however, that for four frames the framing pattern appears in the proper frame position of the bit stream, counter 509 proceeds to a count of four. The counter thereupon applies an enabling potential to the SET input of flip-flop 510. The next framing signal on lead 223 thereupon toggles flip-flop 510 to the SET condition. This removes the out-of-sync signal from lead 209 and disables AND gates 514 and 511. At the same time, flip-flop 510 applies an enabling potential from its Q output through OR gate 513 to the RESET input of flip-flop 508. The next framing signal toggles flip-flop 508 to the RESET condition. At this point, flip-flops 507 and 508 are reset, flip-flop 510 is set and counter 503 has been returned to its initial count condition. This is the normal initial condition of sync lock circuit 206.

Although a specific embodiment of this invention has been shown and described, it will be understood that various modifications may be made without departing from the spirit of this invention.

We claim:

1. An elastic store for receiving incoming frames of serial data, each frame having a fixed number of bits and including at least one framing bit for defining the demarcation between successive incoming frames, comprising, variable delay means for delaying the bits and thereby producing bits delayed a predetermined interval of time;

a local clock for generating framing pulses;

means for detecting the misalignment in time of the delayed framing bit and the generated framing pulse; and means operated in response to the detecting means for cumulatively increasing the delay of the delay means by an interval of time equal to the interval that the increasing means is operating, said increasing means commencing operation at the time that the delayed framing bit is produced and concluding operation at the time that the framing pulse is generated.

2. An elastic store in accordance with claim 1, including means responsive to the extension of the delay interval to a selected maximum interval of time for reducing the delay interval by an interval of time corresponding to the time occupied by one frame of data.

3. An elastic store for receiving incoming frames of serial data, each frame having a fixed number of bits and including at least one framing bit for defining the demarcation between successive incoming frames, comprising, a multistage data bit register;

a local clock for generating framing pulses;

means for inserting the incoming serial bits into the multistage register;

means for reading successive ones of the inserted bits out of selected stages of the multistage register on a first in-first out basis; and means responsive to misalignment in time of the read out framing bit and the framing pulse for selectively shifting the reading means to progressively higher stages of the register concurrently with the shifting of the framing bit thereto for the interval from the time that the framing bit is read out to the time that the framing pulse is generated.

4. An elastic store in accordance with claim 3, wherein the shifting means includes means for operating the reading means to repeatedly read the framing bit out of the multistage register.

5. An elastic store in accordance with claim 4, wherein the data bit register comprises a multistage shift register, the inserting means inserts the incoming bits into an initial one of the stages of the register, the reading means reads the inserted bits out of a selected one of the subsequent stages, the reading means including, counting means for advancing up a count when the inserted bits exceed in number the read out bits and for advancing down the count when the read out bits exceed in number the inserted bits, and means responsive to each of the counter counts for selecting individual ones of the subsequent stages; and the shifting means includes means for advancing up the count of the counting means in response to each insertion of an incoming bit, whereby successive stages are selected concurrent with the shifting of the framing bit thereto.

6. An elastic store in accordance with claim 3 and further including means responsive to the advance of the count to a predetermined number for resetting the counter to a lesser count differing from the predetermined number by the fixed number, whereby one frame of data is discarded and the framing bit of the next frame is read out.

7. An elastic store for receiving frames of data, each frame consisting of a fixed number of data bits, comprising, a multistage data bit register having a storage capacity of at least one frame of data, each stage of the data bit register for storing a data bit;

means for inserting the received data bits into the register at a rate controlled by the rate of the received data bits;

means for reading the inserted data bits out of selected stages of the register at a rate controlled by a local clock, on a first in-first out basis;

means jointly responsive to the inserting means and the reading means for determining a filling of the register with inserted bits awaiting readout; and means responsive to the filling of the register to the storage capacity for selectively shifting the reading means from a first selected stage to a second selected stage, the second selected stage being the fixed number subsequent to the first selected stage to discard the fixed number of data bits stored between the first selected stage and the second selected stage and for operating the reading means to read out the bits from the second selected stage.

8. An elastic store for receiving frames of data, each frame consisting of a fixed number of data bits, comprising, a multistage data bit register having a storage capacity which exceeds one frame of data, each stage of the data bit register for storing a data bit;

means for inserting the received data bits into the register at a rate controlled by the rate of the received data bits;

means for reading the inserted data bits out of selected stages of the register at a rate controlled by a local clock, on a first in-first out basis; and means responsive to readout of the register of substantially all of the bits inserted therein for selectively shifting the reading means from a first selected stage to a second selected stage, the second selected stage being the fixed number previous to the first selected stage, and for operating the reading means to reread from the second selected stage the fixed number of data bits previously read out from the first selected stage.

* * * * *